United States Patent
Du et al.

(10) Patent No.: US 11,716,024 B2
(45) Date of Patent: Aug. 1, 2023

(54) DEADTIME CONTROL SCHEME FOR IMPROVING BUCK CONVERTER LIGHT LOAD EFFICIENCY

(71) Applicants: Jialun Du, Powell, OH (US); Jiwei Fan, Cary, NC (US); Hal Chen, Short Hill, NJ (US)

(72) Inventors: Jialun Du, Powell, OH (US); Jiwei Fan, Cary, NC (US); Hal Chen, Short Hill, NJ (US)

(73) Assignee: Reed Semiconductor Corp., Warwick, RI (US)

( * ) Notice: Subject to any disclaimer, the term of this patent is extended or adjusted under 35 U.S.C. 154(b) by 24 days.

(21) Appl. No.: 17/646,415

(22) Filed: Dec. 29, 2021

(65) Prior Publication Data

US 2023/0208298 A1   Jun. 29, 2023

(51) Int. Cl.
*H02M 3/158* (2006.01)
*H02M 1/00* (2006.01)
*H05B 45/375* (2020.01)

(52) U.S. Cl.
CPC ......... *H02M 3/158* (2013.01); *H02M 1/0009* (2021.05); *H05B 45/375* (2020.01)

(58) Field of Classification Search
CPC .... H02M 3/158; H02M 1/0009; H05B 45/375
See application file for complete search history.

(56) References Cited

U.S. PATENT DOCUMENTS

2009/0323375 A1* 12/2009 Galvano ............... H02M 3/156
363/21.06
2011/0018516 A1* 1/2011 Notman ............... H02M 3/1588
323/284

* cited by examiner

*Primary Examiner* — Jue Zhang
(74) *Attorney, Agent, or Firm* — Dunlap Bennett & Ludwig, PLLC

(57) ABSTRACT

A deadtime control scheme for improving buck converter light load efficiency.

7 Claims, 1 Drawing Sheet

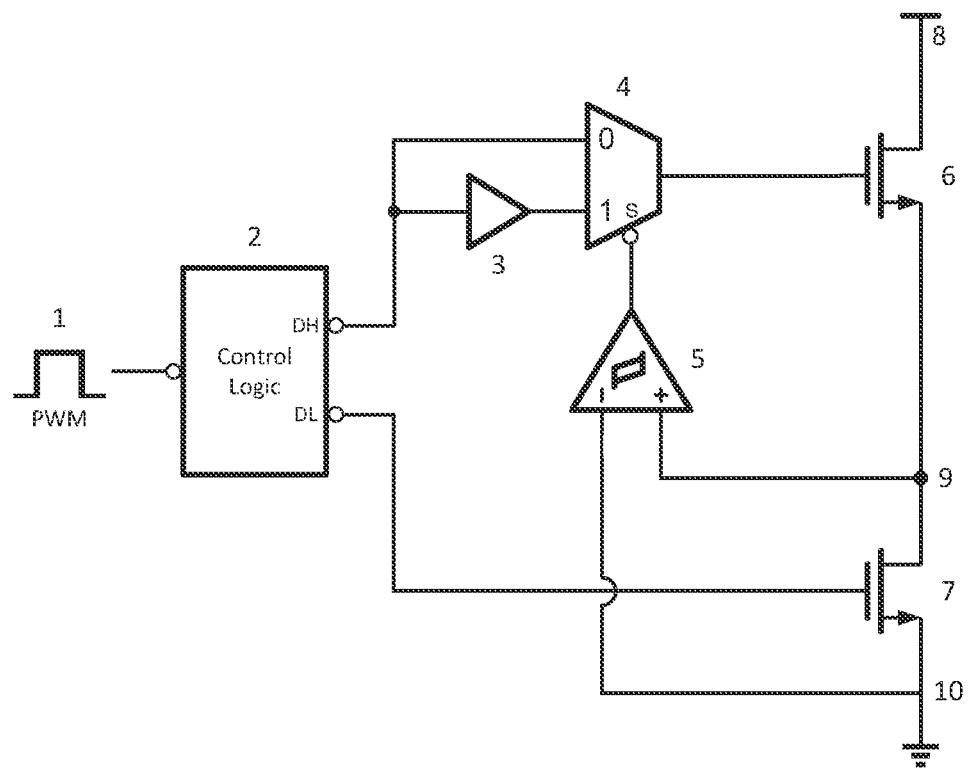

DEADTIME CONTROL SCHEME FOR IMPROVING BUCK CONVERTER LIGHT LOAD EFFICIENCY

BACKGROUND OF THE INVENTION

The present invention relates to DC-to-DC power converters and more particularly, to a deadtime control scheme for improving buck converter light load efficiency.

A buck converter or step-down converter is a DC-to-DC power converter which steps down voltage while drawing less average current from its supply (input) to its load (output). The buck converter controls this current in an energy storage element (e.g., an inductor) by a switch node, which may include two switches (usually a transistor).

In some cases, the amount of energy required by the load is too small, known as a "light load" condition. In this case, the current through the energy storage element/inductor falls to zero during part of the period, resulting in the discharging of an output capacitor during each cycle and therefore higher switching losses. It is sometimes said that the buck converter is operating in a discontinuous mode when the current through the inductor falls to zero during this condition (the "inductor valley current").

A control technique, such as pulse modulation can be used to minimize these losses, whereby the average value of voltage (and current) fed to the load is controlled by modulating the signal.

In medium to high loads, the DC resistance of buck converter switching elements tends to dominate the overall efficiency of the buck converter. When driving light loads, however, the effects of DC resistances are reduced and AC losses in the inductor, capacitor, and switching elements play a larger role in overall efficiency. This is especially true in discontinuous mode operation, in which the inductor current valley drops below zero, resulting in the discharging of the output capacitor and even higher switching losses.

Moreover, light load efficiency in buck converter system is becoming more and more important. Conventional deadtime control would usually trim rising edge dead time (via pulse modification) to a smaller value to meet heavy load efficiency requirement. However, the fixed small rising edge dead time would cause a hit in light load efficiency where switching loss becomes dominant. The present invention presents a new dead time control scheme to improve the light load efficiency by optimizing the rising edge dead time.

When competitor products optimize their dead time for heavy load performance, they would usually aim for a small rising edge dead time for higher efficiency. However, a small rising edge dead time would result in hard switching at light load because the switching node is still at ground level when the high side starts to turn on. Hard switching, as one of the main contributors to switching loss at light load, would cause a big drop in the overall power efficiency. In sum, prior art solutions usually suffer from low efficiency at light load because they optimize their heavy load efficiency by way of a fixed rising edge dead time, resulting in more power consumption or shorter battery life in real world applications.

Accordingly, there is a need for a deadtime control scheme for improving buck converter light load efficiency through increasing the rising edge dead time when the inductor valley current drops below zero (in the discontinuous mode). The increased rising edge dead time would allow the switch node to be charged up to nearly the input voltage by the output inductor current. The high side turn on would become ZVS (zero voltage switching), which improves the light load efficiency significantly.

The present invention uses a zero-cross detector to detect whether the inductor valley current has dropped below zero. Once a zero-cross event is detected, the rising edge dead time will be elongated by delaying the high-side MOSFET turning on. The increased rising edge dead time will allow the switch node voltage to be naturally slewed up to nearly the input voltage by the load current. Therefore, ZVS is achieved when the high side turns on. This would significantly reduce the switching loss and improve the power efficiency. By way of a data selector, when the inductor valley current is above zero, the rising edge dead time will return to a small value so that the heavy load efficiency is maintained.

When comparing against state-of-art products from competitors, the present invention improves the light load efficiency by nearly ten percent without sacrificing heavy load efficiency. Additionally, the present invention can be easily adopted to any power stage or Point-of-Load (POL) product with minor architectural changes.

SUMMARY OF THE INVENTION

In one aspect of the present invention, a switching circuit for a DC-to-DC converter having a first transistor and a second transistor in series between an input terminal and a ground terminal, wherein where a source of the first transistor and a drain of the second transistor are connected as a switch node, the switching circuit including: a control logic driving the first and second transistors by way of first and second control signals, respectively; and a delay element that delays a rising edge of the first control signal when a current has dropped below zero across the second transistor when the second transistor is in an on state.

In another aspect of the present invention, the switching circuit for a DC-to-DC converter further includes the following: a data selector in series with a high output of the control logic and the first control signal, wherein the data selector selects between the high output and the high output coupled to the delay element when forming the first control signal; a zero-cross comparator configured to sense a difference between the switch node and the ground terminal; and a pulse-width modulated (PWM) pulse that drives the control logic, wherein the zero-cross comparator includes hysteresis, wherein the rising edge of the first control signal turns the first transistor to an on state, and wherein the rising edge of the first control signal is defined by a gap between the second transistor turning to an off state and the first transistor turning to the on state.

These and other features, aspects and advantages of the present invention will become better understood with reference to the following drawings, description and claims.

BRIEF DESCRIPTION OF THE DRAWINGS

The sole figure is a detailed schematic view of an exemplary embodiment of a novel deadtime control system illustrating several key factors to make the system function as it should. One can alter their design for monolithic power stage or point-of-load by simply following the descriptions herein.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a deadtime control scheme for improving buck converter light load efficiency.

Referring to the sole Figure, the present invention may include a deadtime control scheme having a pulse-width modulation (PWM) signal (input) 1, a control logic 2, a delay block 3, a 2-to-1 multiplexer 4, a zero-cross comparator 5, a high-side transistor (MOSFET), a low-side transistor (MOSFET), a voltage input 8, a switch node 9, and a ground 10.

The PWM signal 1 is fed into the control logic 2. The control logic 2 processes the rising edge and falling edge dead time and sends the DH and DL outputs to the high side MOSFET 6 and the low side MOSFET 7 respectively. The rising edge and falling edge dead time are optimized for heavy load operation in the control logic 2 by trimming them to a small, fixed value. The DL output will be sent to the gate of the low side MOSFET 7 through some additional logics and level shifter which is omitted for the simplicity of the drawing. The DH will be connected to the $I_0$ terminal of the 2-to-1 multiplexer 4. It will also be connected to the $I_1$ terminal of the 2-to-1 multiplexer 4 through a delay block 3. The purpose of the delay block 3 is to delay the turning on of the high side MOSFET 6 so that when the $I_1$ terminal of the 2-to-1 multiplexer 4 is selected, the rising edge dead time, which is defined by the gap between the low-side MOSFET 7 turning off and the high side MOSFET 6 turning on, will be longer.

The output of the 2-to-1 multiplexer 4 is connected to the gate of the high side MOSFET 6 through some additional logics and level shifter which is omitted for the simplicity of the drawing. The high side MOSFET 6 and low side MOSFET 7 are configured as a typical buck converter, where the source the high side MOSFET 6 and the drain of the low side MOSFET 7 are connected as switch node 9. The zero-cross comparator 5 senses the difference between the switch node 9 and the ground 10 to determine if the current has dropped below zero when the low side MOSFET 7 is on. If a zero-cross event is detected, the $I_1$ input of the 2-to-1 multiplexer 4 will be selected so that the rising edge dead time will be elongated. If there is a switching cycle where the zero-cross event is not detected, the Io input of the 2-to-1 multiplexer 4 will be selected so that the rising edge dead time will go back to the optimized value for heavy load. The delay time of the delay block 3 is chosen in such a way that the switch node 9 will have enough time to slew from ground 10 to the input voltage 8 during the elongated rising edge dead time when the zero-cross event is detected. This ensures ZVS (zero voltage switching) when the high side MOSFET 6 turns on and improves the efficiency significantly at light load condition.

The control logic 2 should be designed to guarantee no cross-conduction risks. This can be achieved by running verifications to cover every possible input PWM pattern.

The delay time of the delay block 3 should be neither too large nor too small. A too small delay would not improve the efficiency at light load by much. A too large delay has two side effects. One side effect is that it will hurt the efficiency at negative load current due to the elongated rising edge dead time during which the high side MOSFET 6 body diode will be conducting. The other side effect is that with a larger rising edge dead time at light load, the PWM pulse width is increased. A sudden increase in the PWM pulse width may cause some disturbance in the control loop. A delay time that can achieve the high side MOSFET 6 ZVS is a good design target.

The zero-cross detector 5 threshold should have hysteresis otherwise it may cause loop jitter when the device is operating at the critical load.

The control logic 2, a delay element (in one embodiment, the delay block 3, though it is understood that other time delay elements can be used) and a data selector (in one embodiment, the 2-to-1 multiplexer 4, though it is understood that other data selectors can be used) are necessary to form the deadtime control system, and in certain embodiments can be merged into one device or resource.

Rather than a fixed delay provided by the delay block 3, the rising edge deadtime at light load can be selectively controlled by detecting whether the switching node 9 has slewed close to the input voltage 8. This can be achieved by adding another comparator that compares the switch node 9 and the input voltage 8 and using the comparator output to adaptively control the turning on of the high side MOSFET 6.

The zero-cross detector 5 does not have to have a threshold of zero. It can be any current level that best meets the performance need.

A designer may need to slightly modify their deadtime control design by following the steps described based on the sole Figures. Then one would need to perform proper design and layout to have a fully functional power stage or POL product. In order to make the invention functional, one would need to follow at least the previous elements/steps that have been identified as required. It is strongly recommended that one follows the optional elements/steps as well to achieve the best performance of this invention. Finally, one would need to find a trusted semiconductor manufacturer to fabricate the product.

It should be understood, of course, that the foregoing relates to exemplary embodiments of the invention and that modifications may be made without departing from the spirit and scope of the invention as set forth in the following claims.

What is claimed is:

1. A switching circuit for a DC-to-DC converter having a first transistor and a second transistor in series between an input terminal and a ground terminal, wherein where a source the first transistor and a drain of the second transistor are connected as a switch node, the switching circuit comprising:
   a control logic driving the first and second transistors by way of first and second control signals, respectively; and
   a delay element that delays a rising edge of the first control signal when a current has dropped below zero across the second transistor when the second transistor is in an on state.

2. The switching circuit of claim 1, further comprising a data selector in series with a high output of the control logic and the first control signal, wherein the data selector selects between the high output and the high output coupled to the delay element when forming the first control signal.

3. The switching circuit of claim 2, further comprising a zero-cross comparator configured to sense a difference between the switch node and the ground terminal.

4. The switching circuit of claim 3, further comprising a pulse-width modulated (PWM) pulse that drives the control logic.

5. The switching circuit of claim 4, wherein the rising edge of the first control signal turns the first transistor to an on state.

6. The switching circuit of claim 5, wherein the rising edge of the first control signal is defined by a gap between the second transistor turning to an off state and the first transistor turning to the on state.

7. The switching circuit of claim 3, wherein the zero-cross comparator includes hysteresis.

* * * * *